(12) United States Patent
Lyon et al.

(10) Patent No.: US 11,976,154 B2
(45) Date of Patent: May 7, 2024

(54) DEVOLATILIZATION APPARATUS AND PROCESS

(71) Applicant: ExxonMobil Chemical Patents Inc., Baytown, TX (US)

(72) Inventors: Michael K. Lyon, Houston, TX (US); Hamidreza Khakdaman, Houston, TX (US); Trevan D. MacArthur, Provo, UT (US); Adrian Strehler, Schaffhausen (CH); Claudio Walker, Winterthur (CH)

(73) Assignee: ExxonMobil Engineering & Technology Company, Baytown, TX (US)

( * ) Notice: Subject to any disclaimer, the term of this patent is extended or adjusted under 35 U.S.C. 154(b) by 605 days.

(21) Appl. No.: 17/152,440

(22) Filed: Jan. 19, 2021

(65) Prior Publication Data

US 2021/0221925 A1    Jul. 22, 2021

Related U.S. Application Data

(60) Provisional application No. 62/963,663, filed on Jan. 21, 2020.

(51) Int. Cl.
| | |
|---|---|
| *C08F 6/10* | (2006.01) |
| *B01D 1/22* | (2006.01) |
| *B01D 19/00* | (2006.01) |
| *C08F 2/01* | (2006.01) |
| *C08F 2/06* | (2006.01) |

(52) U.S. Cl.
CPC ............... *C08F 6/10* (2013.01); *B01D 1/221* (2013.01); *B01D 19/0036* (2013.01); *C08F 2/01* (2013.01); *C08F 2/06* (2013.01)

(58) Field of Classification Search
CPC ... C08F 6/10; C08F 6/00; C08F 6/003; B01D 1/221; B01D 19/0036; B01D 19/0047; B01D 19/0021
See application file for complete search history.

(56) References Cited

U.S. PATENT DOCUMENTS

| | | | |
|---|---|---|---|
| 5,684,125 A | 11/1997 | Nooren | |
| 6,332,958 B1 | 12/2001 | Matsuda et al. | |
| 2005/0234217 A1* | 10/2005 | Bigiavi | C08F 6/003 528/480 |

FOREIGN PATENT DOCUMENTS

| | | | | |
|---|---|---|---|---|
| EP | 756 883 | * | 2/1997 | ............... B01D 3/38 |
| EP | 1 097 947 | | 5/2001 | |
| WO | 2006/014053 | | 2/2006 | |

* cited by examiner

*Primary Examiner* — Renee Robinson

(57) ABSTRACT

In at least one embodiment, a devolatilization vessel includes a first set of one or more devolatilization plates and a second set of one or more devolatilization plates. A first distributor is above the first set of one or more devolatilization plates and the second set of one or more devolatilization plates. A second distributor is above the second set of one or more devolatilization plates. In at least one embodiment, a process of forming a polymer includes forming a first polymer solution having a first viscosity and forming a second polymer solution having a second viscosity. The process includes flowing the first polymer solution and the second polymer solution to a devolatilization vessel. The process includes removing volatiles from the first polymer solution and the second polymer solution in the devolatilization vessel to form a devolatilized first polymer melt and a devolatilized second polymer melt.

20 Claims, 7 Drawing Sheets

DEVOLATILIZATION APPARATUS AND PROCESS

CROSS-REFERENCE TO RELATED APPLICATIONS

This application claims priority to U.S. Ser. No. 62/963,663, filed Jan. 21, 2020, herein incorporated by reference.

FIELD

The present disclosure relates to apparatus and processes of removing volatiles from a polymer melt. In one aspect, the present disclosure more specifically relates to a devolatilization vessel including a plurality of devolatilization plates.

BACKGROUND

Devolatilization technology consists of a series of vapor-liquid flash steps that recovers the polymer from a solution following its synthesis in a reactor. The polymer solution may include polymer, solvent, unreacted monomer, oligomers, and other light molecules. To achieve adequate removal of solvent, unreacted monomer, oligomers, and other light molecules (collectively referred to as "volatiles") from the polymer, the polymer solution is subjected to time and surface renewal at a devolatilization temperature and pressure within a devolatilization vessel. The removal of volatiles from the polymer is a complicated task since solvents and monomers may diffuse slowly from the viscous bulk polymer product, making it difficult to remove solvent and/or monomer at temperatures and pressures that do not harm the polymer. Therefore, there is a need for improved devolatilization methods and apparatuses to recover a polymer from solution.

SUMMARY

In at least one embodiment, a devolatilization vessel includes two sets of one or more devolatilization plates. A first distributor that directs polymer solution to the upper most plate of the first set is located above the first set of one or more devolatilization plates as well as the second set of one or more devolatilization plates. A second distributor is located above the second set of one or more devolatilization plates and below the lower most plate of the first set of devolatilzation plates. In this example, the first distributor is configured to flow a first polymer solution through the first set of one or more devolatilization plates and through the second set of one or more devolatilization plates and the second distributor is configured to flow a second polymer solution through the second set of one or more devolatilization plates.

In another embodiment, a devolatilization vessel includes a first set of one or more devolatilization plates and second set of one or more devolatilization plates. Each plate of the first set of one or more devolatilization plates has a first set of holes that are located at a center region of the plate and has a second set of holes that are located at an edge region of the plate. Each of the second set of holes at the edge region of the plate has a diameter that is greater than the diameter of each hole of the first set of holes at the center of the plate. A distributor is located above the both the first and second sets of one or more devolatilization plates. For example, the distributor is configured to direct the flow of a first polymer solution through the first set of one or more devolatilization plates and then through the second set of one or more devolatilization plates. The distributor is also configured to direct the flow of a second polymer solution through the first set of one or more devolatilization plates bypassing the second set of one or more devolatilization plates.

In at least one embodiment, a composite devolatilization plate includes a first sub-plate having a first plurality of holes and a second sub-plate having an equal number of holes with the same size and shape as those of the first. The second sub-plate is located parallel and proximate to the first plate, and oriented so that the centerline of the two plates are aligned. Displacement of one plate relative to the second plate results in a devolatilization plate having smaller (relative to the fully aligned case) and adjustable composite hole openings due to the partial offset between the holes in the two subplates.

In at least one embodiment, a process of forming a polymer includes forming a first polymer solution having a first viscosity and forming a second polymer solution having a second viscosity. The process includes mixing the two solutions prior to flowing the blended polymer solution to a devolatilization vessel. The process includes removing volatiles from the blended polymer solution in the devolatilization vessel to form the final devolatilized polymer melt.

In at least one embodiment, a polymerization system includes one or more reactors that are operated in series or parallel. One or more devolatilization vessels that also operate in series or parallel are coupled to the reactors. The final devolatilization vessels include two sets of one or more devolatilization plates. A distributor is configured to provide a first flow path through both sets of devolatilization plates. The distributor is also configured to provide a second flow path through either the first set of one or more devolatilization plates or the second set of one or more devolatilization plates. A pelletizer is coupled to the devolatilization vessel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Some embodiments will now be described in greater detail below, including specific embodiments, versions and examples, but the present disclosure is not limited to these embodiments, versions or examples, which are included to enable a person having ordinary skill in the art to make and use embodiments, when the information in this patent is combined with available information and technology.

Various terms as used herein are defined below. To the extent a term used in a claim is not defined below, it should be given the broadest definition persons in the pertinent art have given that term as reflected in one or more printed publications or issued patents.

In at least one embodiment, a polymer manufacturing process includes forming a polymer solution having a particular viscosity. The process includes flowing this polymer solution through a devolatilization vessel to remove volatiles from the polymer. The devolatilization vessel includes a plurality of devolatilization plates that are designed to enable devolatilzation of polymers over a wide viscosity range. The residence time of the polymer solution through the devolatilization plates depends on the polymer melt viscosity. For example, the residence time of a more viscous polymer solution is longer than the residence time of a less viscous polymer solution.

Figure 1:
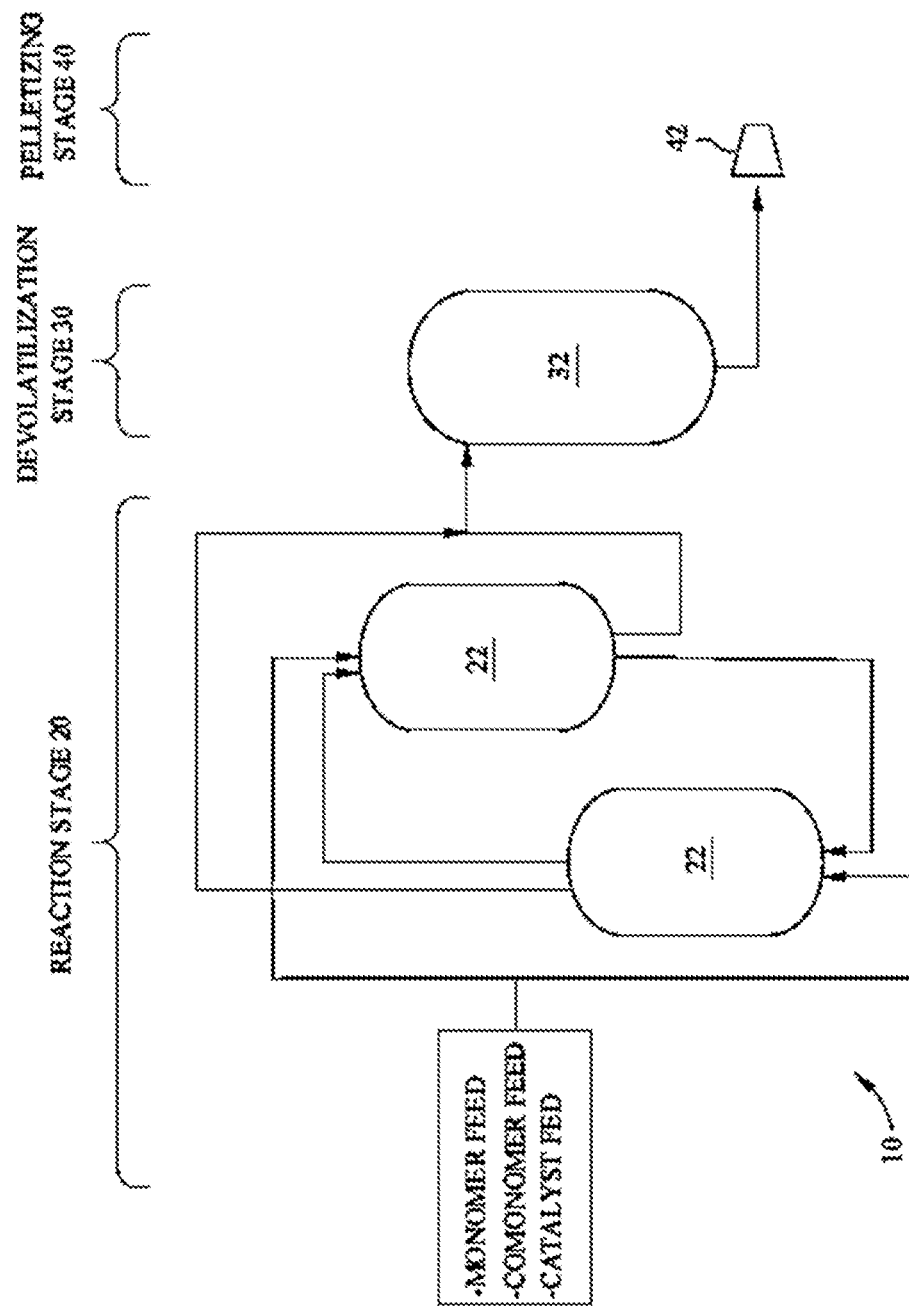
FIG. 1 is a schematic diagram illustrating certain embodiments of a polymerization system.

FIG. 1 is a schematic diagram illustrating certain embodiments of a polymerization system 10. The polymerization system includes a reaction stage 20, a devolatilization stage 30, and a pelletizing stage 40. The reaction stage 20 includes one or more polymerization reactors 22. The reaction stage 20 may make multiple grades of polymer or polymer blends (collectively referred to as polymer(s)). The polymerization reactors 22 may be arranged in series, in loops, and/or in parallel to produce polymers.

The multiple grades of polymers are usually sequentially produced at separate times by changing the polymerization conditions. For example, one or more of the following polymerization conditions may be changed to produce different polymer grades: a monomer feed, a comonomer feed, a catalyst feed, an inert solvent feed, a polymerization temperature, a polymerization pressure, a recirculation of polymer product streams, blending of polymer product streams, and/or other suitable polymerization conditions. The different polymer solutions of the different polymer grades are directed from the reaction stage 20 to the devolatilization stage 30.

The reaction stage 20 is fluidly coupled to the devolatilization stage 30. The polymers are directed from the reaction stage 20 to the devolatilization stage 30 as a polymer solution. The devolatilization stage 30 includes one or more devolatilization vessels 32 to remove volatiles from the polymer solution. Excess volatiles in the polymer may impact bulk polymer properties and end-use manufacturing processes as well as the final products. In certain embodiments, devolatilization vessel 32 removes volatiles from multiple polymer grades. In certain embodiments, an extruder between the one or more devolatilization vessels 32 and the pelletizing stage 40 is merely optional since the devolatilization stage 30 has removed the volatiles to an acceptable level. For example, devolatilization vessel 32 may be directly coupled to a pelletizer without an extruder therebetween.

The devolatilization stage 30 is coupled to the pelletizing stage 40. The different polymer melts of the different polymer grades are directed from the devolatilization stage 30 to the pelletizing stage 40. The pelletizing stage 40 includes a pelletizer 42. The pelletizer 42 may be an underwater pelletizer, a cold cut pelletizer, a hot cut pelletizer, or other type of pelletizer. In certain embodiments, the pelletizer 42 is an underwater pelletizer which provides uniform sized pellets while maintaining end user desired polymer properties.

Figure 2:
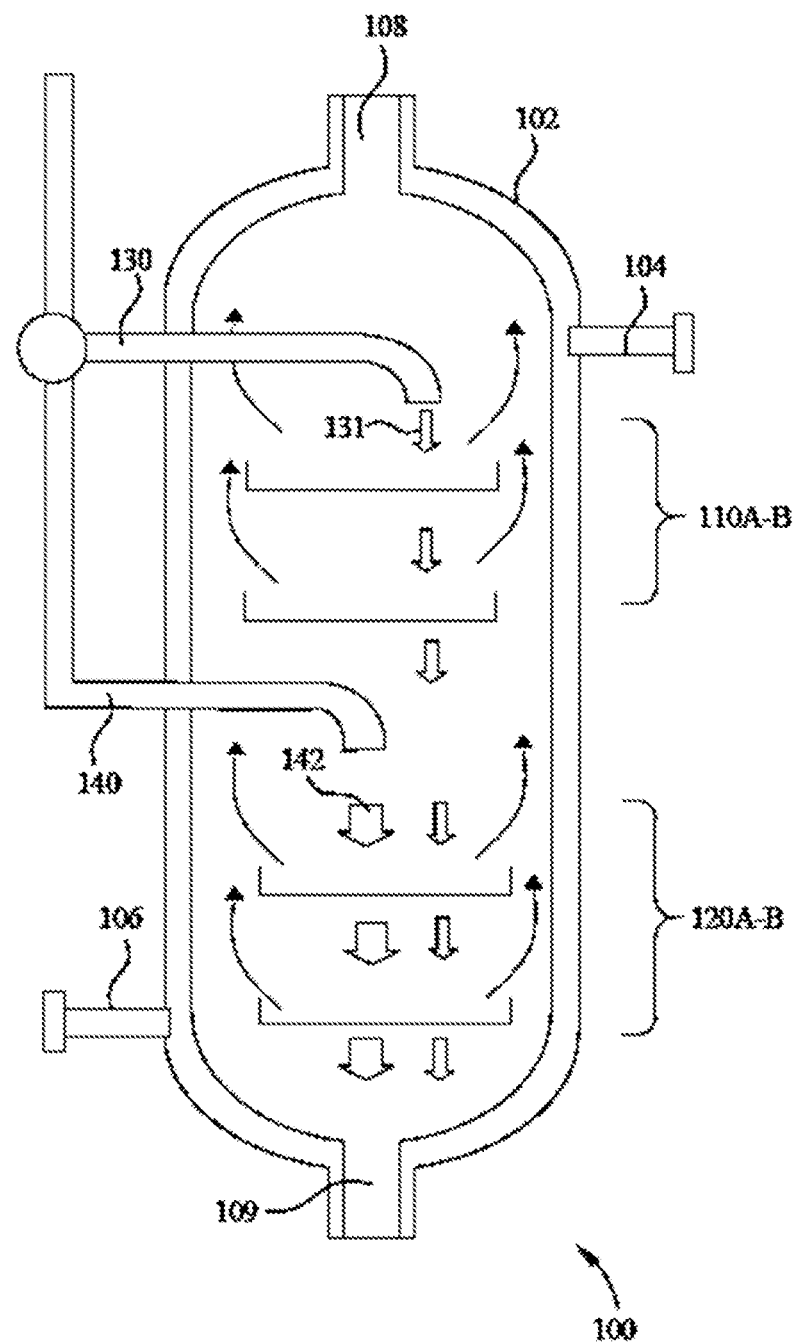
FIG. 2 is a schematic diagram illustrating certain embodiments of a devolatilization vessel.

FIG. 2 is a schematic diagram illustrating certain embodiments of a devolatilization vessel 100. The devolatilization vessel 100 includes a chamber 102. The chamber 102 is formed generally in the shape of a cylinder, but it may be any other shape configured to provide a sub-atmospheric pressure environment. The chamber 102 houses a first set of one or more devolatilization plates 110A-B and a second set of one or more devolatilization plates 120A-B. The number and the distance between each of the devolatilization plates 110A-B may vary. The number and distance between each of the devolatilization plates 120A-B may vary.

The chamber 102 provides the desired temperature and pressure environment to devolatilization of polymer solutions that are comprised of neat polymer melts that have a wide range of zero shear viscosity. For example, the chamber 102 may include a heat exchange fluid inlet 104 and a heat exchange fluid outlet 106 for flowing a heat exchange fluid through the chamber 102 to control the chamber temperature. The heat exchange fluid may include water, aqueous solutions, oil (e.g., hydrocarbons, such as mineral oil, kerosene, hexane, pentane, and the like), and synthetic media. The chamber 102 may include resistive heating elements (not shown) to control the temperature of the chamber.

The devolatilization vessel 100 includes a first distributor 130 and a second distributor 140. The first distributor 130 directs a first polymer solution 131 through the first set of one or more devolatilization plates 110A-B and through the second set of one or more devolatilization plates 120A-B. The second distributor 140 directs a second polymer solution 142 through the second set of one or more devolatilization plates 120A-B, bypassing the first set of one or more devolatilization plates 110A-B. The first polymer solution 131 flowing through the first distributor 130 has a lower viscosity than the second polymer solution 142 provided by the second distributor 140. The first polymer solution 131 and the second polymer solution 142 are introduced into the devolatilization vessel 100 at separate times.

Volatiles from the first polymer solution 131 are removed via the first set of one or more devolatilization plates 110A-B and to a lesser extent the second set of one or more devolatilization plates 120A-B. The first set of one or more devolatilization plates 110A-B and the second set of one or more devolatilization plates 120A-B provide sufficient residence time and polymer solution surface renewal for enhanced volatiles mass transport from the first polymer melt 131 versus the case of vessel 100 possessing no plates. In certain embodiments, the residence time of the first polymer solution on each devolatilization plate 110A-B, 120A-B is from about 20 seconds to 30 minutes, such as from 1 minute to 15 minutes. In certain embodiments, the residence time of the first polymer solution on each devolatilization plate of the first set of plates 110A-B is longer than the residence time of the first polymer melt on each devolatilization plate of the second set of plates 120A-B.

Volatiles from the second polymer solution 142 are removed via the second set of one or more devolatilization plates 120A-B. The second set of one or more devolatilization plates 120A-B provides sufficient residence time and polymer solution surface renewal for enhanced volatiles mass transport from the second polymer melt 142 versus the case of vessel 100 having no plates. In certain embodiments, the residence time of the second polymer melt on each of the devolatilization plates 120A-B is from about 20 seconds to 30 minutes, such as from 1 minute to 15 minutes.

The chamber 102 includes a volatiles outlet 108. The volatiles of the first polymer solution 131 evaporated from the first set of one or more devolatilization plates 110A-B and from the second set of one or more devolatilization plates 120A-B are discharged from the chamber 102 through the volatiles outlet 108. The volatiles of the second polymer melt 142 evaporated from the second set of one or more devolatilization plates 120A-B are also discharged from chamber 102 through the volatiles outlet 108. A low pressure source (not shown), such as a vacuum source, may be coupled to the volatiles outlet 108 to enhance discharge of the volatiles from the polymers and from the chamber 102. A collection system, such as a condensing system, may be coupled to the volatiles outlet 108 to collect the volatiles for disposal, for recycling, or recirculation.

The chamber 102 includes a polymer outlet 109 to collect the devolatilized first polymer melt 131 or the devolatilized second polymer melt 142. The polymer outlet 109 may direct the devolatilized polymer to other components in the polymerization system, such as a pelletizer, an extruder, or other system components. In certain embodiments, the polymer outlet 109 directs the devolatilized polymer to a pump that subsequently delivers the polymer melt to a pelletizer.

Figure 3:
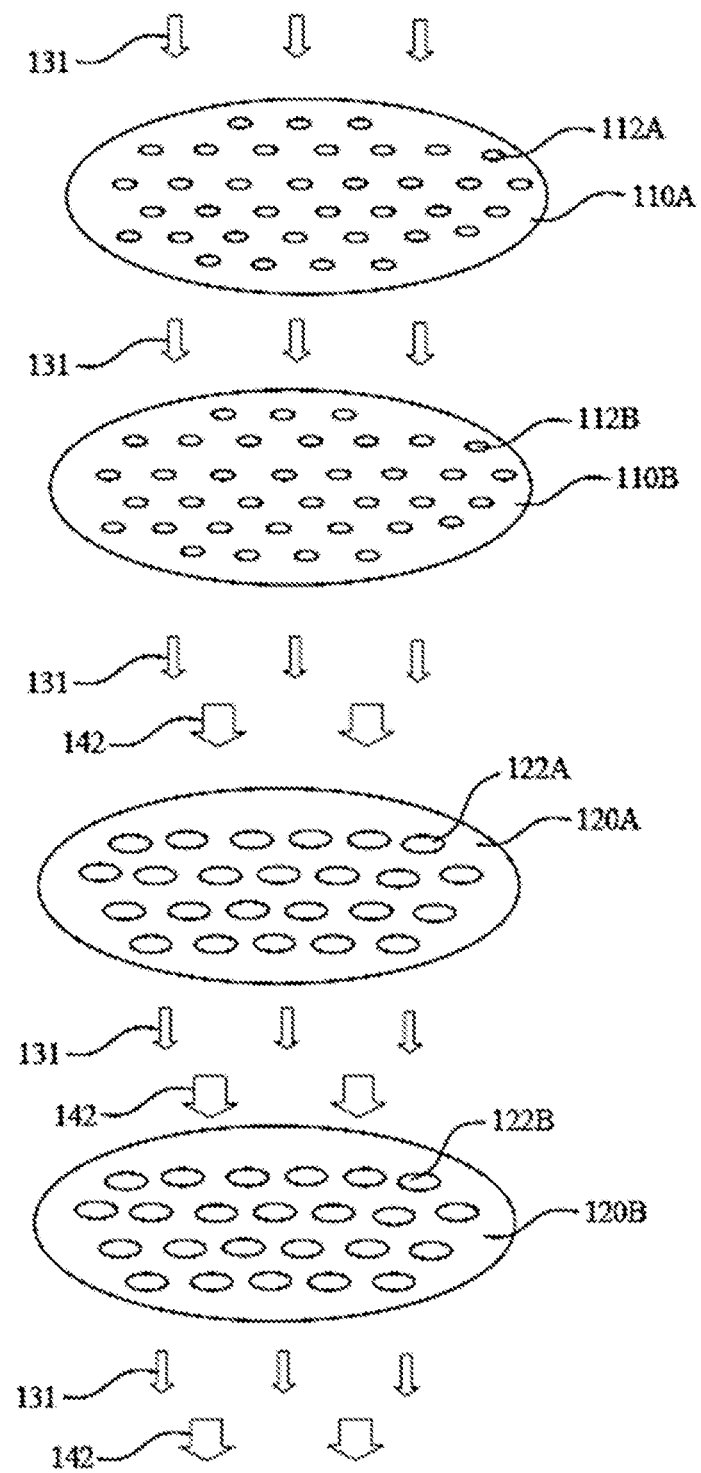
FIG. 3 is a schematic diagram illustrating certain embodiments of a first set of one or more devolatilization plates and a second set of one or more devolatilization plates of FIG. 2.

FIG. 3 is a schematic diagram illustrating certain embodiments of the first set of one or more devolatilization plates 110A-B and the second set of one or more devolatilization plates 120A-B of FIG. 2.

In certain embodiments, each of the devolatilization plates 110A-B, 120A-B includes a rim to form a container or a tray with a suitable depth to hold the polymer solution. For example, the depth of the tray may be from about 500 mm to about 1000 mm. In certain embodiments of a devolatilization plate with a rim, the devolatilization vessel may be operated such that the polymer melt does not flow past the edge of the plate. In certain embodiments of a devolatilization plate with a rim, the devolatilization vessel may be operated such that the polymer melt overflows the rim of the plate. For example, the devolatilization vessel may be operated so that the polymer melt overflows the rim of the plate and down the devolatilization vessel, such as to another plate or to the devolatilization vessel bottom.

Each of the devolatilization plates 110A-B has a plurality of holes 112 and each of the devolatilization plates 120A-B have a plurality of holes 122. The holes 112 and the holes 122 may be any suitable shape, such as circles, ovals, rectangles, slits, or combinations thereof. The number of holes 112 and the number of holes 122 of each of the devolatilization plates may be the same or may vary (e.g., the number of holes of each of devolatilization plates 110A-B, 120A-B is independently selected), but are usually optimized to minimize final product volatiles content. The holes 112 are small size holes as compared to holes 122, which are large size holes, which means that the diameter and/or cross-sectional area of the holes 112 are smaller than the diameter and/or cross-sectional area of the holes 122. For example, the diameter of the holes 112 of the devolatilization plates 110A-B may be less than about 20 mm, such as from about 5 mm to about 10 mm, and the diameter of the holes 122 the devolatilization plates 120A-B may be greater than about 20 mm, such as from about 25 mm to 50 mm.

During use, the first polymer solution 131 flows through the small size holes 112 of the first set of one or more devolatilization plates 110A-B and through the large size holes 122 of the second set of one or more devolatilization plates 120A-B. The second polymer solution 142 bypasses the first set of one or more devolatilization plates 110A-B and flows through the large size holes 122 of the second set of one or more devolatilization plates 120A-B.

In certain embodiments, the first polymer 131 has a melt viscosity that is lower than the melt viscosity of the second polymer 142. In certain embodiments, the first polymer 131 has a low melt viscosity and the second polymer 142 has a high melt viscosity. In certain embodiments, the first polymer 131 has a lower melt viscosity, such as a viscosity from 500 cP to 15,000 cP. In certain embodiments, the second polymer 142 has a higher melt viscosity, such as a melt flow rate from 1 g/10 min to 500 g/10 min.

In certain aspects, a low viscosity first polymer solution 131 flows through more devolatilization plates than a high viscosity second polymer solution 142. For example, a low viscosity first polymer solution 131 flows through a plurality of devolatilization plates and a high viscosity second polymer solution 142 flows through a subset of devolatilization plates. The low viscosity first polymer solution 131 flows faster through the second set of devolatilization plates 120A-B than does the high viscosity second polymer solution 142. The first set of devolatilization plates 110A-B are added to the flow path of the low viscosity first polymer melt 131 to increase residence time and polymer solution surface renewal in the devolatilization vessel 100, which enhances volatiles removal in comparison to using the second set of devolatilization plates 120A-B alone.

In certain embodiments, the holes 112A from a first devolatilization plate 110A and the holes 112B from a second devolatilization plate 110B are offset so that a polymer melt does not fall directly from holes 112A of the first devolatilization plate 110A through the holes 112B of the second devolatilization plate 110B. The term "offset" means that a shape, size, and/or position of a hole of one devolatilization plate is not identical to a shape, size, and/or position of another devolatilization plate. A hole of one devolatilization plate may be offset from a hole of another devolatilization plate by having one or more different attributes of shape, size, or position. Offset holes 112A of the first devolatilization plate 110A and holes 112B of the second devolatilization plate 110B increase the residence time of the polymer solution on the second devolatilization plate 110B thereby increasing volatiles removal from the polymer melt.

In certain embodiments, the holes 122A from a first devolatilization plate 120A and the holes 122B from a second devolatilization plate 120B are offset so that a polymer solution does not fall directly from the holes 122A of the first devolatilization plate 120A through the holes 122B of the second devolatilization plate 120B. Offset holes 122A of the first devolatilization plate 120A and holes 122B of the second devolatilization plate 120B increase the residence time of the polymer melt on the second devolatilization plate 120B thereby increasing volatiles removal from the polymer solution.

In certain embodiments, the first distributor 130 and the second distributor 140 of the devolatilization vessel 100 of FIG. 2 provide separate entrances for the low viscosity first polymer solution 131 and the high viscosity second polymer solution 142 to control the flow path of each polymer solution within the devolatilization vessel 100. The first polymer solution 131 and the second polymer solution 142 have different flow paths through the devolatilization vessel 100. The devolatilization vessel 100 may process different polymer grades having different viscosities by providing sufficient residence time within the devolatilization vessel 100 to remove a sufficient level of volatiles. The low viscosity first polymer solution 131 flows through both the small size holes 112 of devolatilization plates 110A-B and the large size holes 122 of devolatilization plates 120A-B. The high viscosity second polymer solution 142 flows through only the large size holes 122 of the devolatilization plates 120A-B. In certain embodiments, the high viscosity second polymer solution 142 bypasses the first set of devolatilization plates 110A-B to avoid plugging the holes 112 of the first set of the devolatilization plates 110A-B.

Figure 4:
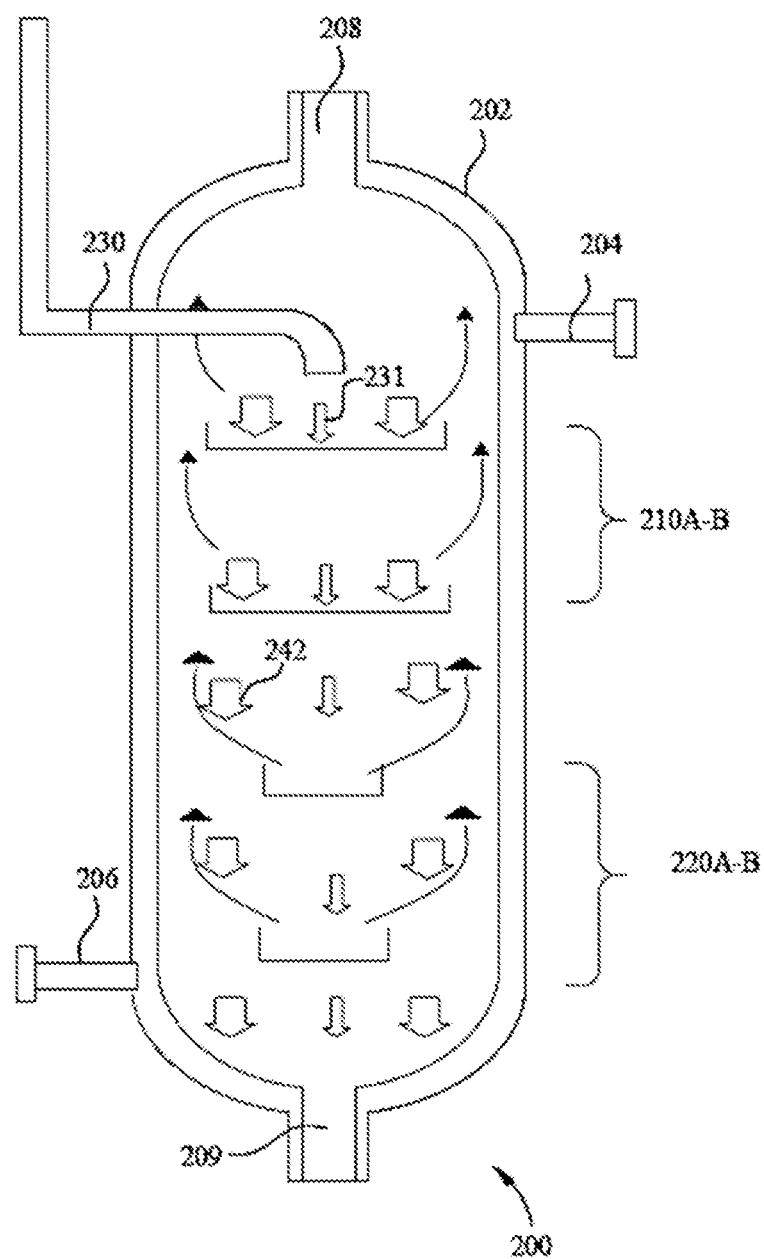
FIG. 4 is a schematic diagram illustrating certain other embodiments of a devolatilization vessel.

FIG. 4 is a schematic diagram illustrating certain other embodiments of a devolatilization vessel. As shown in FIG. 4, devolatilization vessel 200 includes a chamber 202. The chamber 202 is formed generally in the shape of a cylinder, but it may be any other shape configured to provide a sub-atmospheric pressure environment. The chamber 202 houses a first set of one or more devolatilization plates 210A-B and a second set of one or more devolatilization plates 220A-B. In general, the number of devolatilization plates and the distance between each of the devolatilization plates in a devolatilization vessel of the present disclosure may vary. For example, the distance between each of the devolatilization plates 210A-B (and/or 220A-B) may be the same or different.

The chamber 202 provides a desired temperature and pressure environment to devolatilize polymer solutions that are comprised of neat polymer melts that have a wide range of neat zero shear viscosity. For example, the chamber 202 may include a heat exchange fluid inlet 204 and a heat exchange fluid outlet 206 for flowing a heat exchange fluid through the chamber 202 to control chamber temperature. The heat exchange fluid may include water, aqueous solutions, oil (e.g., hydrocarbons, such as mineral oil, kerosene, hexane, pentane, and the like), and synthetic media. The chamber 202 may include resistive heating elements (not shown) to control the chamber temperature.

The devolatilization vessel 200 includes a distributor 230. The distributor 230 directs a first polymer solution 231 and a second polymer solution 242 at separate times through the first set of one or more devolatilization plates 210A-B. The first polymer 231 usually has a lower melt viscosity than the second polymer 242.

The first set of one or more devolatilization plates 210A-B provides sufficient residence time and polymer solution surface renewal for the first polymer solution 231 and the second polymer solution 242 on the plates 210A-B for enhanced flash evaporation of volatiles from the polymer versus the case of vessel 202 containing no plates.

The first polymer solution 231 flows from the first set of one or more devolatilization plates 210A-B to a second set of one or more devolatilization plates 220A-B. The second set of one or more devolatilization plates 220A-B provides additional residence time and polymer solution surface renewal for the first polymer 231 on the plates 220A-B for additional flash evaporation of volatiles from the polymer. Volatiles from the first polymer solution 231 are evaporated from the first set of one or more devolatilization plates 210A-B and the second set of one or more devolatilization plates 220A-B.

During a different time a second polymer solution 242 flows from the first set of one or more devolatilization plates 210A-B to the bottom of the devolatilization vessel 200 bypassing the second set of one or more devolatilization plates 220A-B. Volatiles from the second polymer solution 242 are evaporated from the first set of one or more devolatilization plates 210A-B.

The chamber 202 includes a volatiles outlet 208. The volatiles from the first polymer solution 231 evaporated from the first set of one or more devolatilization plates 210A-B and from the second set of one or more devolatilization plates 220A-B are discharged from the chamber 202 through the volatiles outlet 208. The volatiles of the second polymer solution 242 evaporated from the first set of one or more devolatilization plates 210A-B are also discharged from the chamber 202 through the volatiles outlet 208. A low pressure source (not shown), such as a vacuum source, may be coupled to the volatiles outlet 208 to enhance discharge of the volatiles from the chamber 202. A collection system, such as a condensing system, may be coupled to the volatiles outlet 208 to collect the volatiles for disposal, for recycling, or recirculation.

The chamber 202 includes a polymer outlet 209 to collect the first polymer melt 231 and the second polymer melt 242. The polymer outlet 209 may direct the devolatilized polymer melt to other components in the polymerization system, such as a pelletizer, an extruder, or other system components. In certain embodiments, the polymer outlet 209 directs the devolatilized polymer melt to a pump that subsequently delivers the polymer melt to a pelletizer.

Figure 5:
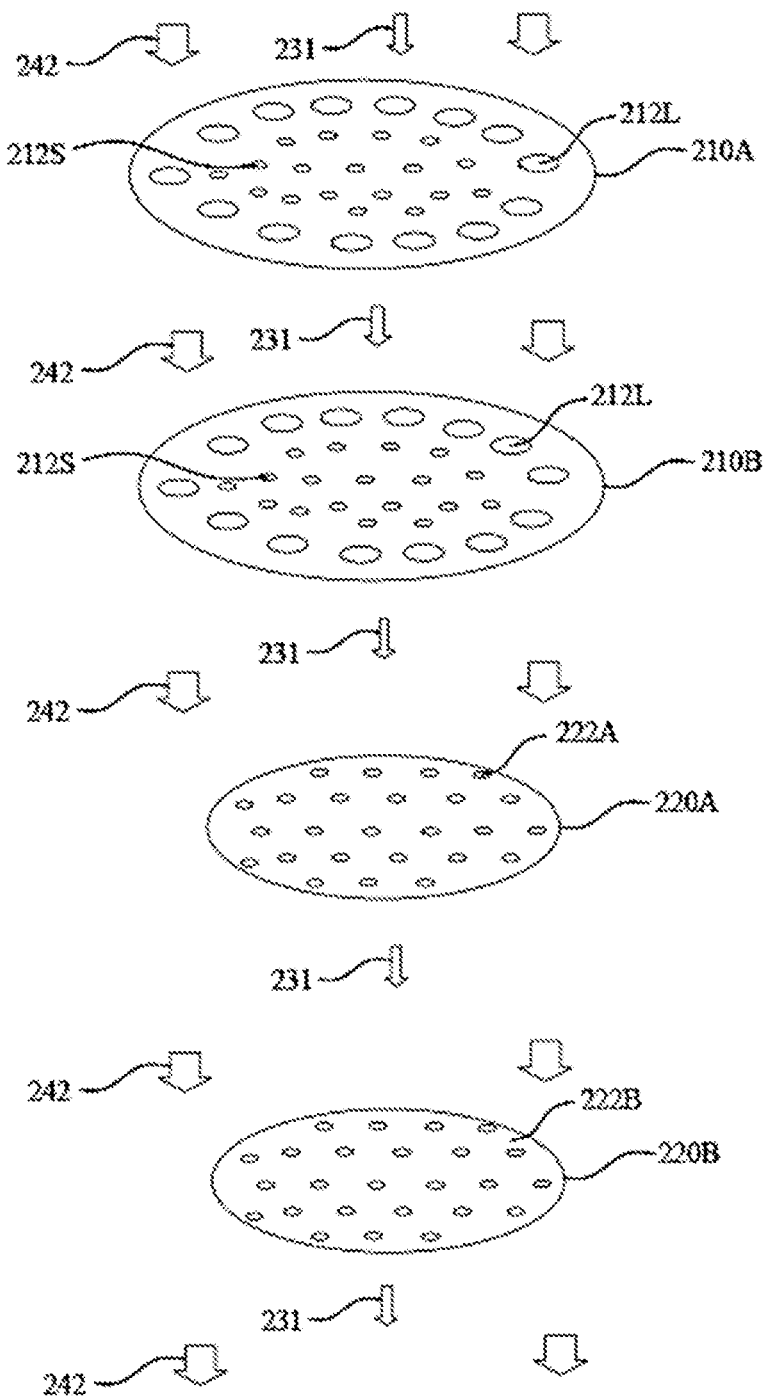
FIG. 5 is a schematic diagram illustrating certain other embodiments of a first set of one or more devolatilization plates and a second set of one or more devolatilization plates of FIG. 4.

FIG. 5 is a schematic diagram illustrating certain other embodiments of the first set of one or more devolatilization plates 210A-B and the second set of one or more devolatilization plates 220A-B of FIG. 4.

In certain embodiments, each of the devolatilization plates 210A-B and 220A-B include a rim to form a tray with a suitable depth to hold the polymer melt solution. For example, the depth of the tray may be from 500 mm to about 1000 mm. In certain embodiments of a devolatilization tray, the devolatilization vessel may be operated such that the polymer melt does not flow over the tray edge. In certain embodiments of a devolatilization tray, the devolatilization vessel may be operated such that the polymer melt overflows the tray rim. For example, the devolatilization vessel may be operated so that the polymer melt overflows the rim/edge of the plate and down the devolatilization vessel, such as to another plate or to the devolatilization vessel bottom.

Each of the devolatilization plates 210A-B have a plurality of holes 212 and each of the devolatilization plates 220A-B have a plurality of holes 222. The holes 212 and the holes 222 may be any suitable shape, such as circles, ovals, rectangles, slits, or combinations thereof. The number of holes 212 and the number of holes 222 on each of the devolatilization plates may be the same or may vary.

The holes 212 of the first set of devolatilization plates 210A-B includes large size holes 212L and small size holes 212S. In certain embodiments, the large size holes 212L are at an edge region of the devolatilization plates 210A-B and the small size holes 212S are at a center region of the devolatilization plates 210A-B. For example, the diameter and/or cross-sectional area of the holes 212S are smaller than the diameter and/or cross-sectional area of the holes 212L. For example, the diameter of the holes 212S of the devolatilization plates 210A-B may be less than about 20 mm, such as from about 5 mm to about 10 mm, and the diameter of the holes 212L the devolatilization plates 210A-B may be greater than about 20 mm, such as from about 25 mm to 50 mm.

The second set of one or more devolatilization plates 220A-B has a smaller outer circumference than the first set of devolatilization plates 210A-B. The small size holes 212S in the center region of the devolatilization plates 210A-B are positioned over the second set of one or more devolatilization plates 220A-B. The large size holes 212L at an edge region of the devolatilization plates 210A-B are positioned beyond the outer edge of the second set of one or more devolatilization plates 220A-B. The holes 222 of the second set of one or more devolatilization plates 220A-B may be small sized holes, such as holes having a diameter of less than about 20 mm, such as from about 5 mm to about 10 mm.

The first polymer solution 231 flows primarily through the small size holes 212S rather than the large size holes 212L of the first set of one or more devolatilization plates 210A-B. Then, the first polymer solution 231 flows from the first set of one or more devolatilization plates 210A-B to the second set of one or more devolatilization plates 220A-B and flows through the holes 222 of the second set of one or more devolatilization plates 220A-B. The first polymer solution 231 may be introduced at a certain rate so that the first polymer solution 231 does not flow to the large size holes 212L.

The second polymer solution 242 flows primarily through the large size holes 212L rather than the small size holes 212S of the first set of one or more devolatilization plates 210A-B. For example, the second polymer solution 242 may flow at a low rate through the small sized holes 212S and may flow at a large flow rate through the large sized holes 212L. Then, the second polymer solution 242 primarily flows from the first set of one or more devolatilization plates 210A to the bottom of the devolatilization vessel bypassing the second set of one or more devolatilization plates 220A-B. The large size holes 212L at an edge region of the devolatilization plates 210A-B are positioned beyond the outer edge of the second set of one or more devolatilization plates 220A-B.

In certain embodiments, the polymer associated with first polymer solution 231 has a lower zero shear melt viscosity than the polymer associated with second polymer solution 242. In certain embodiments, the polymer dissolved in the first solution 231 has a low zero shear viscosity, such as a viscosity from 500 cP to 15,000 cP. In certain embodiments, the second polymer melt 242 has a high viscosity, such as a melt flow rate from 1 g/10 min to 500 g/10 min.

In certain aspects, the low viscosity first polymer solution 231 flows through more devolatilization plates than the high viscosity second polymer melt 242. For example, the low viscosity first polymer solution 231 flows through a plurality of devolatilization plates and the high viscosity second polymer solution 242 flows through a subset of devolatilization plates.

The second set of devolatilization plates 210A-B are added to the flow path of the low viscosity first polymer solution 231 to increase the residence time and polymer solution surface renewal in the devolatilization vessel 200. This enhances removal of volatiles from the polymer versus the case in which only the first set of devolatilization plates 210A-B are used.

In certain embodiments, the holes 212L from a first devolatilization plate 210A and the holes 212L from a second devolatilization plate 210B are offset so that a polymer solution does not fall directly from holes 212L of the first devolatilization plate 210A through the holes 212L of the second devolatilization plate 210B. A hole of one devolatilization plate may be offset from a hole of another devolatilization plate by having one or more different attributes of shape, size, or position. Offset holes 212L of the first devolatilization plate 210A and holes 212L of the second devolatilization plate 210B increase the residence time of the polymer solution on the second devolatilization plate 210B, thereby increasing volatile removal from the polymer.

In certain embodiments, the holes 212S from a first devolatilization plate 210A and the holes 212S from a second devolatilization plate 210B are offset so that a polymer solution does not fall directly from holes 212S of the first devolatilization plate 210A through the holes 212S of the second devolatilization plate 210B. Offset holes 212S of the first devolatilization plate 210A and holes 212S of the second devolatilization plate 210B increase the residence time of the polymer solution on the second devolatilization plate 210B, thereby increasing volatiles removal from the polymer.

In certain embodiments, the holes 222A from a first devolatilization plate 220A and the holes 222B from a second devolatilization plate 220B are offset so that a polymer solution does not fall directly from the holes 222A of the first devolatilization plate 220A through the holes 222B of the second devolatilization plate 220B. Offset holes 222A of the first devolatilization plate 220A and holes 222B of the second devolatilization plate 220B increase the residence time of the polymer solution on the second devolatilization plate 220B, thereby increasing volatile removal from the polymer.

In certain embodiments, the distributor 230 of the devolatilization vessel 200 of FIG. 4 provides the same entrance for the low viscosity first polymer solution 231 and the high viscosity second polymer solution 242. Separate flow paths through the devolatilization plates in the devolatilization vessel 200 are provided by the different sized holes 212 of the first set of one or more devolatilization plates 210A-B. The devolatilization vessel 200 may handle different polymer grades with different viscosities by providing sufficient residence time and polymer solution surface renewal within the devolatilization vessel 200 to remove a sufficient level of volatiles. The low viscosity first polymer solution 231 flows through both the first set of one or more devolatilization plates 210A-B and the second set of one or more devolatilization plates 220A-B.

The high viscosity second polymer solution 242 primarily flows through the large size holes 212L of the devolatilization plates 210A-B. The high viscosity second polymer solution 242 bypasses the second set of the devolatilization plates 220A-B and flows to the bottom of the devolatilization vessel 200.

Figure 6A:
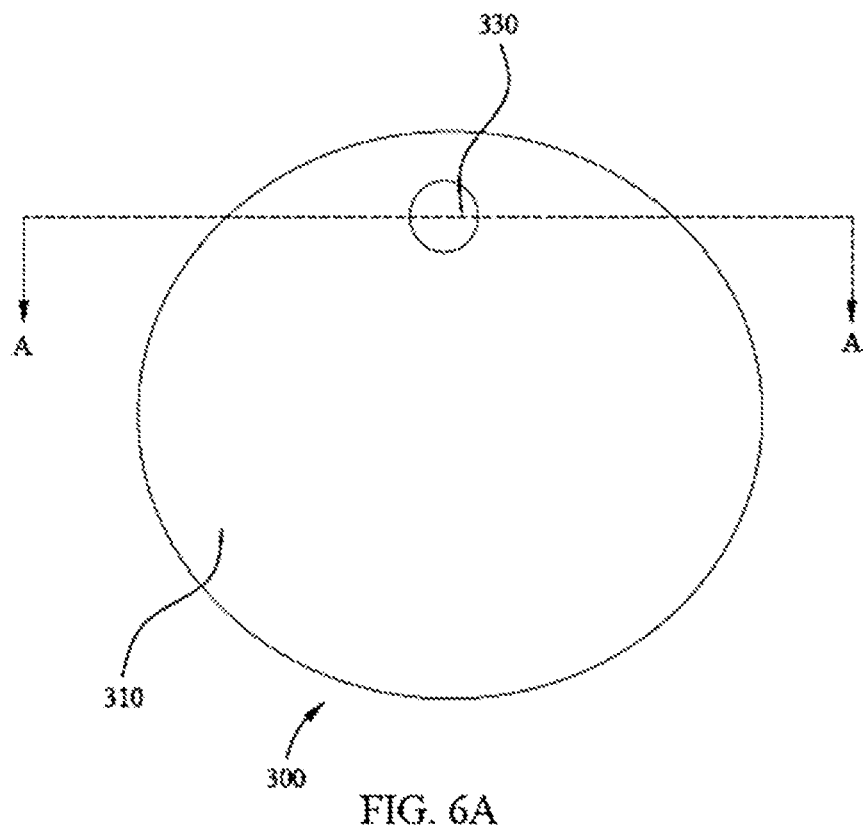
FIG. 6A is a schematic diagram illustrating certain embodiments of a composite devolatilization plate.
Figure 6B:
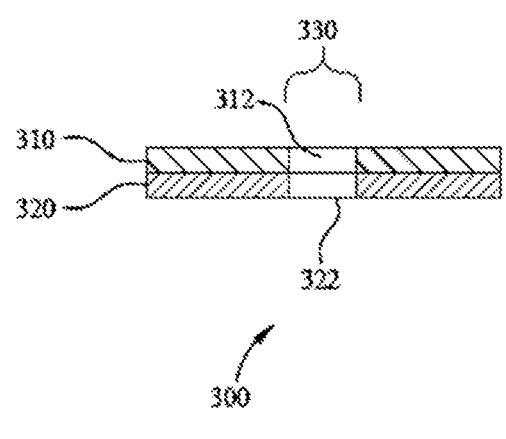
FIG. 6B is a schematic diagram illustrating certain embodiments of a composite devolatilization plate.
Figure 6C:
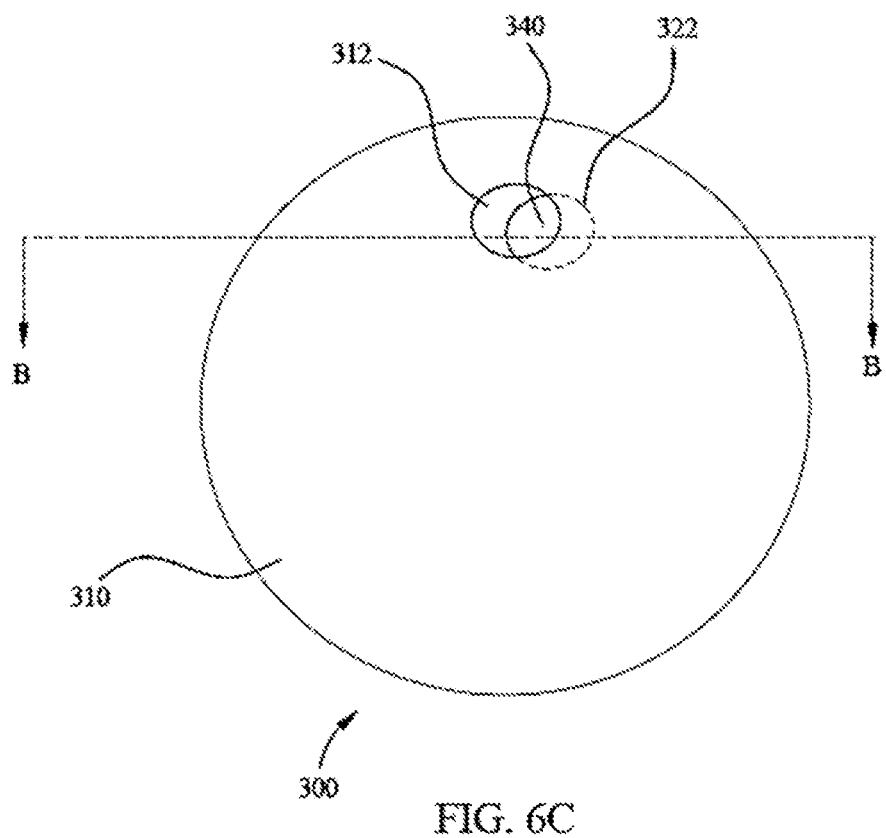
FIG. 6C is a schematic diagram illustrating certain embodiments of a composite devolatilization plate.
Figure 6D:
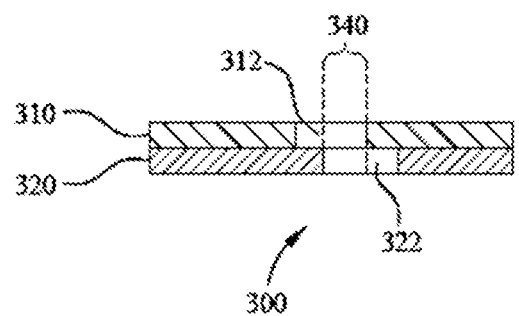
FIG. 6D is a schematic diagram illustrating certain embodiments of a composite devolatilization plate.

FIGS. 6A-D are schematic diagrams illustrating certain embodiments of a composite devolatilization plate 300. FIG. 6A is a top view of the devolatilization plate 300 in a first position and FIG. 6C is a top view of the devolatilization plate 300 in a second position. FIG. 6B is a cross-sectional view of the devolatilization plate 300 through plane A-A of FIG. 6A. FIG. 6D is a cross-sectional view of the devolatilization plate 300 through plane B-B of FIG. 6C. The devolatilization plate 300 may be used in the devolatilization vessel 100 of FIG. 2, the devolatilization vessel 200 of FIG. 4, or other suitable vessels.

As shown in FIGS. 6AD, the devolatilization plate 300 includes a first sub-plate 310 having a first plurality of holes 312 (for ease of illustration one hole is shown in the figures) and includes a second sub-plate 320 having a second plurality of holes 322 (for ease of illustration one hole is shown in the figures). The second sub-plate 320 is located below and proximate the first sub-plate 310. The first sub-plate 310 and the second sub-plate 320 may be situated in a spaced apart relationship or may be in sliding contact with each other. In certain some embodiments, the first sub-plate 310 and the second sub-plate 320 have an equal number of holes with the same size and shape.

As shown in FIGS. 6A and 6B, in the first position, the first plurality of holes 312 of the first sub-plate 310 and the second plurality of holes 322 of the second sub-plate 320 are aligned. The aligned holes 312, 322 form large open holes 330 through the devolatilization plate 300. As shown in FIGS. 6C and 6D, in the second position, the first plurality of holes 312 of the first sub-plate 310 and the second plurality of holes 322 of the second sub-plate 320 are at a minimum partially offset. A hole of one sub-plate may be offset from a hole of another sub-plate by having one or more different attributes of shape, size, or position. The offset holes 312, 322 form small hole openings 340 through the devolatilization plate 300. The first sub-plate 310 and the second sub-plate 320 can be reversibly disposed in the first position and in the second position to control the size of the hole openings formed from holes 312 of the first sub-plate 310 and the holes 322 of the second sub-plate 320. In certain aspects, the size of the hole openings of the composite devolatilization plate 300 for a certain polymer melt with a certain viscosity can be adjusted by rotating or laterally displacing the sub-plates relative to each other. The large sized though holes 330 of the composite devolatilization plate 300 in the first position have a larger diameter than the small sized hole openings 340 of the composite devolatilization plate 300 in the second position. For example, the large sized though holes 330 may have a diameter greater than about 20 mm, such as from about 25 mm to 50 mm. For example, the small sized though holes 340 may have a diameter less than about 20 mm, such as from about 5 mm to about 10 mm.

As shown in FIGS. 6A-D, the first sub-plate 310 and the second sub-plate 320 are circular in shape. In certain embodiments, the first sub-plate 310 or the second sub-plate 320 can be rotated relative to the second plate to render the devolatilization plate 300 to the first position or other positions with smaller hole openings. In other embodiments, the first sub-plate and the second sub-plate are shaped as rectangles, grids, or other polygonal shapes in which the first plate and the second plate can be aligned to generate the maximum hole size of the first position and to other smaller composite hole openings via lateral and rotational motion of one plate relative to the second.

The devolatilization of a polymer solution may be performed in the devolatilization vessel 32, 100, 200 of FIGS. 1, 2, 4, respectively, or another suitable vessel, utilizing the devolatilization plates 110A-B, 120A-B, 210A-B, 220A-B, 300 of FIGS. 2-6 or other suitable devolatilization plates, or combinations thereof. The same combination of vessel and devolatilization plates may be used to devolatilize polymer solutions that are comprised of neat polymer having a low or high zero shear melt viscosity. The low viscosity polymer solution contains polymer having a low zero shear melt viscosity, such as a viscosity from 500 cP to 15,000 cP. The high viscosity polymer solution contains polymer having a high zero shear melt viscosity, such as a melt flow rate from 1 g/10 min to 500 g/10 min. The polymer melt may be introduced to the devolatilization vessel at any suitable feed temperature, such as a feed temperature from 100° C. to 250° C., such as 145° C. to 220° C. The polymer melt may be introduced to the devolatilization vessel at any suitable feed pressure, such as a feed pressure from 100 psig to 1,000 psig, such as from 300 psig to 700 psig. The inner temperature of the devolatilization vessel may be maintained at any suitable temperature, such as at a temperature from 100° C. to 250° C., such as 145° C. to 210° C. The inner pressure of the devolatilization vessel may be maintained at any suitable low pressure, such as at a pressure of less than atmospheric pressure, such as from zero to 50 Torr.

The polymer products of the polymer melts may be elastomers, thermoplastics, thermoplastic elastomers, or other types of polymers. Each polymer product may comprise any polyolefin, such as a polypropylene, propylene based polyolefin, polyethylene, ethylene based polyolefin, polystyrene, or combinations thereof. The polyolefins may be any polymerized olefins, such as polyolefins formed by polymerization of one or more monomers including substituted or unsubstituted $C_2$ to $C_{40}$ alpha-olefins. The monomers may form part of the first and/or second polymer solution. Examples of monomers include ethylene, propylene, butene, pentene, hexene, heptene, octene, nonene, decene, undecene, dodecene, norbornene, cyclopentene, cycloheptene, cyclooctene, cyclododecene, oxanorbornene, substituted derivatives thereof, isomers thereof, homologs thereof, and mixtures thereof. Each polymer melt may further comprise one or more diolefin monomers. Examples of diolefin monomers include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, 5-vinyl-2-norbornene, norbornadiene, 5-ethylidene-2-norbornene, divinylbenzene, dicyclopentadiene, and mixtures thereof.

In certain embodiments, an inert solvent may be present during the polymerization process. The solvent may form part of the first and/or second polymer solution. Examples of inert solvents include straight, branched-chain, cyclic, alicyclic, halogenated, or aromatic hydrocarbons and mixtures thereof. Examples of straight and branched-chain hydrocarbons include isobutane, butane, pentane, isopentane, hexane, isohexane, heptane, octane, dodecane, and mixtures thereof. Examples of cyclic and alicyclic hydrocarbons include cyclohexane, cycloheptane, methylcyclohexane, methylcycloheptane, and mixtures thereof. Examples of halogenated hydrocarbons include fluorinated $C_4$-$C_{10}$ alkanes and chlorobenzene. Examples of aromatic compounds include benzene, toluene, mesitylene, and xylene.

In the devolatilization vessel, the vessel contains a plurality of devolatilization plates, such as the devolatilization plates 110A-B, 120A-B, 210A-B, 220-A-B, 310, 320 of FIGS. 2-6, other suitable devolatilization plates, or combinations thereof. The devolatilization plates provide surface renewal by mixing and deforming the polymer solution to shorten the diffusion path of volatiles from the polymer, which enhancing volatiles mass transport. The devolatilization plates may be any suitable shape, such as a circle, rectangle, grid, polygon, or combinations thereof. The devolatilization plates include small and large size holes. For example, the small size holes may have a circular shape and have a diameter of less than about 20 mm, such as a diameter from about 5 mm to about 10 mm. For example, the large size holes may have a circular shape and have a diameter of greater than about 20 mm, such as a diameter from about 25 mm to about 50 mm. In certain embodiments, the residence time of the polymer melt on each devolatilization plate is from about 20 seconds to 30 minutes, such as from 1 minute to 15 minutes.

The devolatilization vessel, such as devolatilization vessel 100, 200 of FIGS. 2 and 4 or other suitable devolatilization vessel, may contain any number of devolatilization plates, such as the devolatilization plates 110A-B, 120A-B, 210A-B, 220-AB, 310, 320 of FIGS. 2-6, other suitable devolatilization plates, or combinations thereof. For example, devolatilization vessel 100 includes a first set of one or more devolatilization plates 110A-B, such as from 1 to 10 plates with small sized holes 112, and includes a second set of one or more devolatilization plates 120A-B, such as from 1 to 10 plates with large sized holes 122. For example, devolatilization vessel 200 includes a first set of one or more devolatilization plates 210A-B, such as from 1 to 10 plates with small sized holes 212S and large sized holes 212L, and includes a second set of one or more devolatilization plates 120A-B, such as from 1 to 10 plates with small sized holes 222. A high viscosity polymer solution, such as polymer melt having a melt flow rate from 1 g/10 min to 500 g/10 min, primarily flows through the large size holes. A low viscosity polymer melt, such as a polymer melt having a viscosity from 500 cP to 15,000 cP, flows through the small size holes and may optionally also flow through the large size holes.

The devolatilization vessel may devolatilize two separate polymer melts with different viscosities without having to change devolatilization plates during operation of the devolatilization vessel. Changing a devolatilization plate from a devolatilization vessel may involve venting the devolatilization vessel to atmosphere and cooling the vessel for safe handling of a devolatilization plate already installed in the devolatilization vessel. Changing a devolatilization plate from a devolatilization vessel results in undesirable downtime of the devolatilization vessel and of the polymer system. In certain embodiments, the polymer melt (e.g., the first polymer melt and/or the second polymer melt) introduced to the devolatilization vessel comprises a polymer content of from 80 wt % to 99% wt %, such as 85 wt % to 97 wt %, based on the weight of the polymer melt.

In certain embodiments, a devolatilization vessel having a plurality of devolatilization plates is used in a polymerization system, such as the polymerization system 10 of FIG. 1 or other suitable polymerization system. In certain embodiments, the polymer melt exits the devolatilization vessel with a volatiles content of 5,000 ppm or less, such as 1,500 ppm or less, or such as 1,000 μm or less. In certain embodiments, the devolatilization vessel is coupled to a pelletizer without an extruder between the devolatilization vessel and the pelletizer.

In at least one embodiment, a process of forming a polymer includes forming at separate times a first polymer melt having a first viscosity and forming a second polymer melt having a second viscosity. For example, the first polymer melt has a higher viscosity than the second polymer melt. The first polymer melt and the second polymer melt are flowed at separate times to a devolatilization vessel. Volatiles are removed from the first polymer melt and the second polymer melt at separate times in the devolatilization vessel to form a devolatilized first polymer melt and a devolatilized second polymer melt. The devolatilization vessel includes a plurality of devolatilization plates. A flow path of the first polymer melt is through more devolatilization plates than a flow path of the second polymer melt. The process forms different grades of polymers with a wide range of viscosity utilizing the same devolatilization vessel. In at least one embodiment, the devolatilization vessel includes two distributors to separately provide polymer solutions to the devolatilization vessel. For example, a low viscosity first polymer solution is provided to the vessel via a first distributor, and a higher viscosity second polymer solution is provided to the vessel via a second distributor.

In another embodiment, the devolatilization vessel includes a distributor to separately provide two polymer solution to the devolatilization vessel at separate times. The devolatilization vessel may include at least one devolatilization plate having small size and large size holes. For example, a low viscosity polymer solution flows primarily through the small sized holes of the devolatilization plate. A high viscosity polymer solution flows primarily through the large sized holes of the devolatilization plate.

The devolatilization vessel and devolatilization plates provide a devolatilized polymer with low volatiles content without having to change the devolatilization plates of the devolatilization vessel. In certain embodiments, the devolatilization vessel and devolatilization plates have high uptime and productivity to produce consistent devolatilized polymer products of different viscosities.

Embodiments Listing

The present invention provides, among others, the following embodiments, each of which may be considered as optionally including any alternate embodiments.

Clause 1. A devolatilization vessel, comprising:
a first set of one or more devolatilization plates;
a second set of one or more devolatilization plates;
a first distributor above the first set of one or more devolatilization plates and the second set of one or more devolatilization plates; and
a second distributor above the second set of one or more devolatilization plates.

Clause 2. The devolatilization vessel of any of the Clauses 1 or 3 to 10, wherein the first distributor is configured to provide a first polymer solution through the first set of one or more devolatilization plates and through the second set of one or more devolatilization plates; and wherein the second distributor is configured to provide a second polymer solution through the second set of one or more devolatilization plates.

Clause 3. The devolatilization vessel of any of the Clauses 1 to 2 or 4 to 10, wherein a flow path of the first polymer solution through the first set of one or more devolatilization plates and through the second set of one or more devolatilization plates is longer than a flow path of the second polymer solution through the second set of one or more devolatilization plates.

Clause 4. The devolatilization vessel of any of the Clauses 1 to 3 or 5 to 10, wherein each plate of the first set of one or more devolatilization plates has a plurality of holes and wherein each plate of the second set of one or more devolatilization plates has a plurality of holes.

Clause 5. The devolatilization vessel of any of the Clauses 1 to 4 or 6 to 10, wherein the plurality of holes of the first set of one or more devolatilization plates has a diameter that is smaller than a diameter of the plurality of holes of the second set of one or more devolatilization plates.

Clause 6. The devolatilization vessel of any of the Clauses 1 to 5 or 7 to 10, wherein the holes of a first plate of the first set and the holes of a second plate of the first set are offset from each other.

Clause 7. The devolatilization vessel of claim any of the Clauses 1 to 6 or 8 to 10, wherein the holes of a first plate of the second set and the holes of a second plate of the second set are offset from each other.

Clause 8. The devolatilization vessel of claim any of the Clauses 1 to 7 or 9 to 10, wherein the first set of one or more devolatilization plates are disposed above the second set of one or more devolatilization plates.

Clause 9. The devolatilization vessel of claim any of the Clauses 1 to 8 or 10, wherein the second distributor is further disposed below the first set of one or more devolatilization plates and above the second set of one or more devolatilization plates.

Clause 10. The devolatilization vessel of any of the Clauses 1 to 9, wherein each of the plurality of holes of the first set of one or more devolatilization plates have a diameter from about 5 mm to about 10 mm and wherein each of the plurality of holes of the second set of one or more devolatilization plates have a diameter from about 25 mm to 50 mm.

Clause 11. A devolatilization vessel, comprising:
a first set of one or more devolatilization plates, each plate having:
a first set of holes at a center region of the plate, the holes of the first set of holes having a first diameter, and
a second set of holes at an edge region of the plate, the holes of the second set of holes having a second diameter, wherein the second diameter is larger than the first diameter;
a second set of one or more devolatilization plates, each plate having a plurality of holes, wherein the second set of one or more devolatilization plates is below the first set of one or more devolatilization plates; and
a distributor above the first set of one or more devolatilization plates and the second set of one or more devolatilization plates.

Clause 12. The devolatilization vessel of any of the Clauses 11 or 13 to 20, wherein the distributor is configured to flow a first polymer solution through the first set of one or more devolatilization plates and through the second set of one or more devolatilization plates, and the distributor is configured to flow a second polymer solution through the first set of one or more devolatilization plates bypassing the second set of one or more devolatilization plates.

Clause 13. The devolatilization vessel of any of the Clauses 11 to 12 or 14 to 20, wherein the distributor is configured to flow the first polymer melt and the second polymer melt at separate times.

Clause 14. The devolatilization vessel of any of the Clauses 11 to 13 or 15 to 20, wherein the first diameter is from about 5 mm to about 10 mm; and the second diameter is from about 25 mm to about 50 mm.

Clause 15. The devolatilization vessel of any of the Clauses 11 to 14 or 16 to 20, wherein an outer diameter of the first set of one or more devolatilization plates is larger than an outer diameter of the second set of one or more devolatilization plates.

Clause 16. The devolatilization vessel of any of the Clauses 11 to 15 or 17 to 20, wherein the distributor is configured to provide a first flow path and a second flow path different than the first flow path.

Clause 17. The devolatilization vessel of any of the Clauses 11 to 16 or 18 to 20, wherein the first flow path is through the first set of holes of the first set of one or more devolatilization plates and then through the second set of one or more devolatilization plates.

Clause 18. The devolatilization vessel of any of the Clauses 11 to 17 or 19 to 20, wherein the second flow path is through the second set of holes of the first set of one or more devolatilization plates and bypasses the second set of one or more devolatilization plates.

Clause 19. The devolatilization vessel of any of the Clauses 11 to 18 or 20, wherein the first set of one or more devolatilization plates is disposed above the second set of one or more devolatilization plates.

Clause 20. The devolatilization vessel of any of the Clauses 11 to 19, wherein the plurality of holes of the second set of one or more devolatilization plates are small holes.

Clause 21. A composite devolatilization plate, comprising:
a first sub-plate having a first plurality of holes;
a second sub-plate disposed proximate to the first plate, the second sub-plate having a second plurality of holes; and
the first sub-plate and the second sub-plate positionable in a first position and a second position, wherein the first plurality of holes and the second plurality of holes are aligned in the first position, wherein the first plurality of holes and the second plurality of holes are at least partially offset in the second position.

Clause 22. The composite devolatilization plate of any of the Clauses 21 or 23 to 28, wherein the first plate and the second plate are circular in shape.

Clause 23. The composite devolatilization plate of any of the Clauses 21 to 22 or 24 to 28, wherein the first plate is rotatable relative to the second plate.

Clause 24. The composite devolatilization plate of any of the Clauses 21 to 23 or 25 to 28, wherein the first plate and the second plate are rectangular in shape.

Clause 25. The composite devolatilization plate of any of the Clauses 21 to 24 or 26 to 28, wherein an intersection of the first plurality of holes and the second plurality of holes form large size open holes in the first position.

Clause 26. The composite devolatilization plate of any of the Clauses 21 to 25 or 27 to 28, wherein the large size open holes have a diameter from about 25 mm to about 50 mm.

Clause 27. The composite devolatilization plate of any of the Clauses 21 to 26 or 28, wherein the first plurality of holes and the second plurality of holes form small size open holes in the second position.

Clause 28. The composite devolatilization plate of any of the Clauses 21 to 27, wherein the small size open holes have a characteristic dimension from about 5 mm to about 10 mm.

Clause 29. A process of forming a polymer comprising:
forming a first polymer solution having a first viscosity;
forming a second polymer solution having a second viscosity;
flowing the first polymer solution and the second polymer solution at separate times to a devolatilization vessel; and
removing volatiles from the first polymer solution and the second polymer solution at separate times in the devolatilization vessel to form a devolatilized first polymer melt and a devolatilized second polymer melt.

Clause 30. The process of any of the Clauses 29 or 31 to 38, wherein the first polymer melt has a lower neat viscosity than the second polymer melt.

Clause 31. The process of any of the Clauses 29 to 30 or 32 to 38, wherein removing volatiles from the first polymer solution and the second polymer solution comprises:
- flowing the first polymer solution through a plurality of devolatilization plates to remove volatiles from the first polymer solution; and
- flowing the second polymer solution through a subset of the plurality of the plurality of devolatilization plates to remove volatiles from the second polymer solution.

Clause 32. The process of any of the Clauses 29 to 31 or 33 to 38, wherein flowing the first polymer solution and the second polymer solution to the devolatilization vessel comprises flowing the first polymer solution through a first distributor and flowing the second polymer solution through a second distributor.

Clause 33. The process of any of the Clauses 29 to 32 or 34 to 38, wherein flowing the first polymer solution and the second solution to the devolatilization vessel comprises flowing the first polymer solution and the second polymer solution utilizing a same distributor.

Clause 34. The process of any of the Clauses 29 to 33 or 35 to 38, further comprising pelletizing the devolatilized first polymer melt and the devolatilized second polymer melt.

Clause 35. The process of any of the Clauses 29 to 34 or 36 to 38, wherein removing volatiles from the first polymer solution and the second polymer solution comprises:
- flowing the first polymer from a first distributor;
- flowing the second polymer from a second distributor;
- flowing the first polymer solution through a low viscosity flow path via a first set of one or more devolatilization plates and then through a second set of one or more devolatilization plates; and
- flowing the second polymer solution through a high viscosity flow path via the second set of one or more devolatilization plates.

Clause 36. The process of any of the Clauses 29 to 35 or 37 to 38, wherein the high viscosity flow path bypasses the first set of one or more devolatilization plates.

Clause 37. The process of any of the Clauses 29 to 36 or 38, wherein removing volatiles from the first polymer solution and the second polymer solution comprises:
- flowing the first polymer solution and the second polymer solution utilizing a same distributor;
- flowing the first polymer solution on a low viscosity flow path through a first set of one or more devolatilization plates and through a second set of one or more devolatilization plates; and
- flowing the second polymer solution through a high viscosity flow path via the first set of one or more devolatilization plates.

Clause 38. The process of any of the Clauses 29 to 37, wherein the high viscosity flow path bypasses the first set of one or more devolatilization plates.

Clause 39. A polymerization system, comprising:
- one or more reactors,
- a devolatilization vessel coupled to the one or more reactors, the devolatilization vessel, comprising:
  - a first set of one or more devolatilization plates;
  - a second set of one or more devolatilization plates; and
  - a distributor configured to provide a first flow path through both the first set of one or more devolatilization plates and the second set of one or more devolatilization plates, and configured to provide a second flow path through either the first set of one or more devolatilization plates or the second set of one or more devolatilization plates; and
- a pelletizer coupled to the devolatilization vessel.

Clause 40. The polymerization system of any of the Clauses 39 or 41 to 44, wherein the one or more reactors are configured to produce a first polymer grade having a first viscosity and to produce a second polymer grade having a second viscosity.

Clause 41. The polymerization system of any of the Clauses 39 to 40 or 42 to 44, wherein the second viscosity is higher than the first viscosity.

Clause 42. The polymerization system of any of the Clauses 39 to 41 or 43 to 44, wherein the distributor is configured to provide the first polymer grade to the first flow path and configured to provide the second polymer grade to the second flow path.

Clause 43. The polymerization system of any of the Clauses 39 to 42 or 44, wherein the distributor comprises a first distributor and a second distributor, wherein the first distributor is configured to provide the first polymer grade to the first flow path and wherein the second distributor is configured to provide the second polymer grade to the second flow path.

Clause 44. The polymerization system of any of the Clauses 39 to 43, wherein the pelletizer is directly coupled to the devolatilization vessel without an extruder therebetween.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A devolatilization vessel, comprising:
a first set of one or more devolatilization plates, wherein each plate of the first set of one or more devolatilization plates has a first plurality of holes;
a second set of one or more devolatilization plates, and wherein each plate of the second set of one or more devolatilization plates has a second plurality of holes and a diameter of the second plurality of holes are different than a diameter of the first plurality of holes;
a first distributor above the first set of one or more devolatilization plates and the second set of one or more devolatilization plates; and
a second distributor above the second set of one or more devolatilization plates.

2. The devolatilization vessel of claim 1, wherein the first distributor is configured to provide a first polymer solution through the first set of one or more devolatilization plates and through the second set of one or more devolatilization plates; and wherein the second distributor is configured to provide a second polymer solution through the second set of one or more devolatilization plates.

3. The devolatilization vessel of claim 2, wherein a flow path of the first polymer solution through the first set of one or more devolatilization plates and through the second set of one or more devolatilization plates is longer than a flow path of the second polymer solution through the second set of one or more devolatilization plates.

4. The devolatilization vessel of claim 1, wherein the diameter of the first plurality of holes of the first set of one or more devolatilization plates is smaller than the diameter of the second plurality of holes of the second set of one or more devolatilization plates.

5. The devolatilization vessel of claim 4, wherein each of the first plurality of holes of the first set of one or more devolatilization plates have a diameter from about 5 mm to about 10 mm and wherein each of the second plurality of holes of the second set of one or more devolatilization plates have a diameter from about 25 mm to 50 mm.

6. The devolatilization vessel of claim 1, wherein the first set of one or more devolatilization plates are disposed above the second set of one or more devolatilization plates.

7. The devolatilization vessel of claim 1, wherein the second distributor is further disposed below the first set of one or more devolatilization plates and above the second set of one or more devolatilization plates.

8. A devolatilization vessel, comprising:
a first set of one or more devolatilization plates, each plate having:
a first set of holes at a center region of the plate, the holes of the first set of holes having a first diameter, and
a second set of holes at an edge region of the plate, the holes of the second set of holes having a second diameter, wherein the second diameter is larger than the first diameter;
a second set of one or more devolatilization plates, each plate having a plurality of holes, wherein the second set of one or more devolatilization plates is below the first set of one or more devolatilization plates; and
a distributor above the first set of one or more devolatilization plates and the second set of one or more devolatilization plates.

9. The devolatilization vessel of claim 8, wherein the distributor is configured to flow a first polymer solution through the first set of one or more devolatilization plates and through the second set of one or more devolatilization plates, and the distributor is configured to flow a second polymer solution through the first set of one or more devolatilization plates bypassing the second set of one or more devolatilization plates.

10. The devolatilization vessel of claim 8, wherein the first diameter is from about 5 mm to about 10 mm; and the second diameter is from about 25 mm to about 50 mm.

11. The devolatilization vessel of claim 8, wherein an outer diameter of the first set of one or more devolatilization plates is larger than an outer diameter of the second set of one or more devolatilization plates.

12. The devolatilization vessel of claim 8, wherein the distributor is configured to provide a first flow path and a second flow path different than the first flow path, wherein the first flow path is through the first set of holes of the first set of one or more devolatilization plates and then through the second set of one or more devolatilization plates.

13. The devolatilization vessel of claim 12, wherein the second flow path is through the second set of holes of the first set of one or more devolatilization plates and bypasses the second set of one or more devolatilization plates.

14. A polymerization system, comprising;
one or more reactors;
a devolatilization vessel coupled to the one or more reactors, the devolatilization vessel comprising:
a first set of one or more devolatilization plates, wherein each plate of the first set of one or more devolatilization plates has a first plurality of holes;
a second set of one or more devolatilization plates, wherein each plate of the second set of one or more devolatilization plates has a second plurality of holes and a diameter of the second plurality of holes are different than a diameter of the first plurality of holes; and
a distributor configured to provide a first flow path through both the first set of one or more devolatilization plates and the second set of one or more devolatilization plates, and configured to provide a second flow path through either the first set of one or more devolatilization plates or the second set of one or more devolatilization plates; and
a pelletizer coupled to the devolatilization vessel.

15. A process of forming a polymer comprising:
forming a first polymer solution having a first viscosity;
forming a second polymer solution having a second viscosity;
flowing the first polymer solution and the second polymer solution at separate times to a devolatilization vessel; and
removing volatiles from the first polymer solution and the second polymer solution at separate times in the devolatilization vessel to form a devolatilized first polymer melt and a devolatilized second polymer melt;
wherein the devolatilization vessel comprises:
a first set of one or more devolatilization plates, wherein each plate of the first set of one or more devolatilization plates has a first plurality of holes;

a second set of one or more devolatilization plates, and wherein each plate of the second set of one or more devolatilization plates has a second plurality of holes and a diameter of the second plurality of holes are different than a diameter of the first plurality of holes;

a first distributor above the first set of one or more devolatilization plates and the second set of one or more devolatilization plates; and a second distributor above the second set of one or more devolatilization plates.

16. The process of claim 15, wherein the first polymer melt has a lower neat viscosity than the second polymer melt.

17. The process of claim 15, wherein removing volatiles from the first polymer solution and the second polymer solution comprises:

flowing the first polymer solution through the first set of devolatilization plates and the second set of devolatilization plates to remove volatiles from the first polymer solution; and flowing the second polymer solution through the second set of devolatilization plates to remove volatiles from the second polymer solution.

18. The process of claim 15, wherein removing volatiles from the first polymer solution and the second polymer solution comprises:

flowing the first polymer solution from the first distributor;

flowing the second polymer solution from the second distributor;

flowing the first polymer solution through a low viscosity flow path via the first set of one or more devolatilization plates and then through the second set of one or more devolatilization plates; and flowing the second polymer solution through a high viscosity flow path via the second set of one or more devolatilization plates.

19. The process of claim 18, wherein the high viscosity flow path bypasses the first set of one or more devolatilization plates.

20. The process of claim 15, wherein removing volatiles from the first polymer solution and the second polymer solution comprises:

flowing the first polymer solution and the second polymer solution utilizing a same distributor;

flowing the first polymer solution on a low viscosity flow path through the first set of one or more devolatilization plates and through the second set of one or more devolatilization plates; and flowing the second polymer solution through a high viscosity flow path via the first set of one or more devolatilization plates.

* * * * *